S. ROTHAUSKI.
VEHICLE SAFETY DEVICE.
APPLICATION FILED FEB. 3, 1921.

1,382,858.

Patented June 28, 1921.
2 SHEETS—SHEET 1.

Inventor
Simon Rothauski
By
Attorney

S. ROTHAUSKI.
VEHICLE SAFETY DEVICE.
APPLICATION FILED FEB. 3, 1921.

1,382,858.

Patented June 28, 1921.
2 SHEETS—SHEET 2.

Inventor
Simon Rothauski
By Zoltan A. Polachek
Attorney

UNITED STATES PATENT OFFICE.

SIMON ROTHAUSKI, OF AKRON, OHIO.

VEHICLE SAFETY DEVICE.

1,382,858.      Specification of Letters Patent.      Patented June 28, 1921.

Application filed February 3, 1921. Serial No. 442,087.

*To all whom it may concern:*

Be it known that I, SIMON ROTHAUSKI, a citizen of Hungary, residing at Akron, in the county of Summit and State of Ohio, have invented certain new and useful Improvements in Vehicle Safety Devices, of which the following is a specification.

This invention relates to fenders for vehicles, being intended more particularly for application to automobiles, motor trucks, or the like.

The invention has for an object to provide a novel and simplified type of fender, in which the fender proper, or apron, is normally carried in a raised position, and is automatically lowered when the vehicle strikes any object in front thereof.

For further comprehension of the invention, and of the objects and advantages thereof, reference will be had to the following description and accompanying drawings, and to the appended claims in which the various novel features of the invention are more particularly set forth.

Figure 1 of the drawings is a partial side view of an automobile, showing the invention applied thereto.

Figure 1:
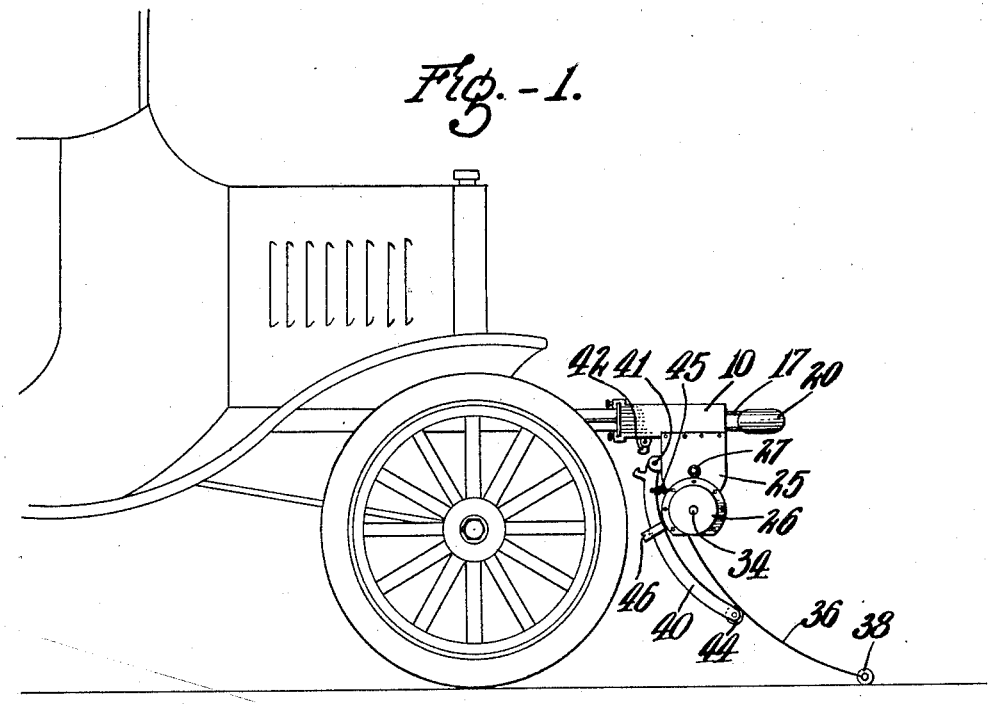
Figures 2, 3:
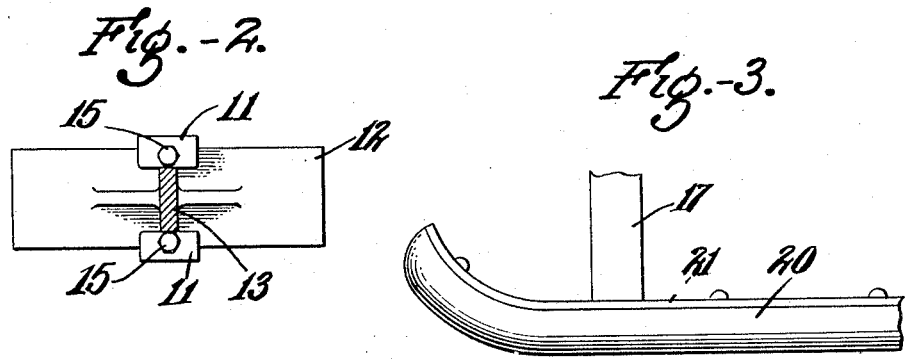
Fig. 2 is a detail transverse section illustrating particularly the means for adjustably mounting the fender on the automobile, or other vehicle, this view being taken on the line 2—2 of Fig. 5.
Fig. 3 is a detail plan view of one end of the bumper bar.
Figure 4:
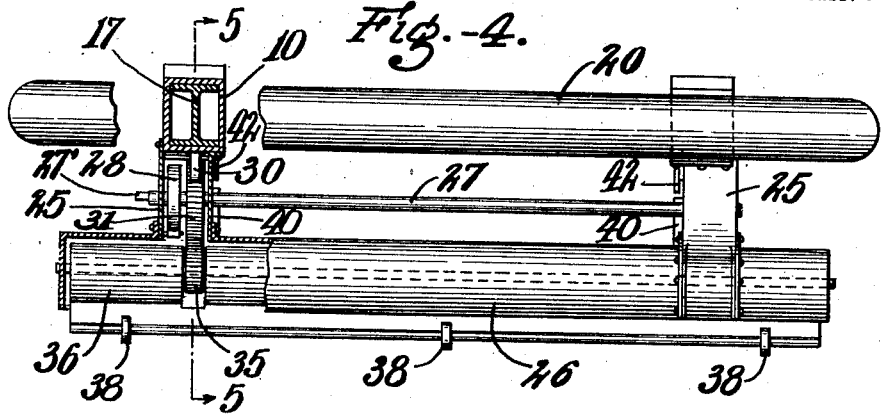
Fig. 4 is a front elevation of the fender with part thereof broken away along the line 4—4 of Fig. 5.

In constructing my improved fender I provide a pair of elongated guide-frames or guides, 10 arranged one on each side of the vehicle and extending longitudinally thereof, these frames carrying the various fender elements. To secure these frames to the automobile they are formed on the rear end, at upper and lower edges with the angular flanges 11 which engage over the edges of a pair of transversely elongated plates such as 12 formed on the forward ends of brackets 13 adapted to be secured by bolts and nuts such as at 14 to the side frames of the chassis, the flanges 11 being secured to the plates by set screws 15 taking through the flanges.

Within each of these guide-frames 10 is slidably carried a slide-bar 17 whose forward end projects beyond the frame and is adapted to carry a bumper bar. These slide-bars 17 are normally pressed to their forward position by coiled expansion springs such as 18 which are located in the frames 10 and bear against the rear ends of the slide-bars. The bumper bar may comprise a rubber strip 20 bent to semi-circular cross-section and having its edges clamped between a strap 21 fixed to the ends of the slide-bars 17 and a second strap 22 secured by screws as at 23 to the bars 17.

Secured to the undersides of the frames 10 are two boxes 25 to the lower ends of which are fixed in turn a transversely extending cylindrical casing 26, the bottoms of the boxes opening into the top of the casing as clearly shown in the drawings. Journaled in these boxes 25 is a shaft 27 to which is secured one end of each of a pair of strong clock-springs such as 28, the opposite ends of the clock-springs being fixed to the walls of the boxes, as indicated at 29, the shaft 27 having a squared end 27' for the reception of a suitable handle for rotating the shaft and winding the clock-springs. To normally hold the shaft 27 against reverse rotation a pawl 30 is pivoted in each of the boxes 25 and engages a gear wheel 31 fixed on the shaft. Formed on this pawl is a tail 30' which projects upwardly through an opening in the bottom of the frame 10 into a notch 32 in the slide-bar 17 so that when the latter moves inward the tail 30' will be depressed and the shaft 27 freed.

Mounted in the casing 26 is a shaft 34 on which is fixed a gear 35 meshing with the gear 31. To this shaft is also fixed one end of an apron 36 adapted to be wound therearound, and whose opposite end projects freely through a slot in the bottom of the casing, the apron being arranged in such a manner that it will emerge from the slot in a downwardly and forwardly direction as shown. This apron may be made of suitable material, such as thin sheet steel, having sufficient flexibility to be wound in the casing 26, but at the same time having enough rigidity to maintain its downward and forward inclination as it is extended in position.

Upon the lower end of the apron 36 is mounted in any suitable manner a series of rollers 38 which are adapted to rest on the roadway when the apron is fully extended. I also provide a means for supporting the apron at a point between the rollers 38 and the casing 26. This means comprises a pair of arms 40 hinged as at 41 to the boxes 25 and normally held in a rearwardly extending position by pawls such as 42 having tails projecting through suitable apertures in the bottoms of the frames 10, these pawls engaging hooked fingers such as 43 on the arms 40. The free ends of the arms 40 may be connected by a bar 44. When released from the pawls 42 the arms 40 are thrown downward and forward by springs such as 45 and may be held against backward movement by spring-pressed hooked members such as 46, past which they snap as they swing downward.

Figure 5:
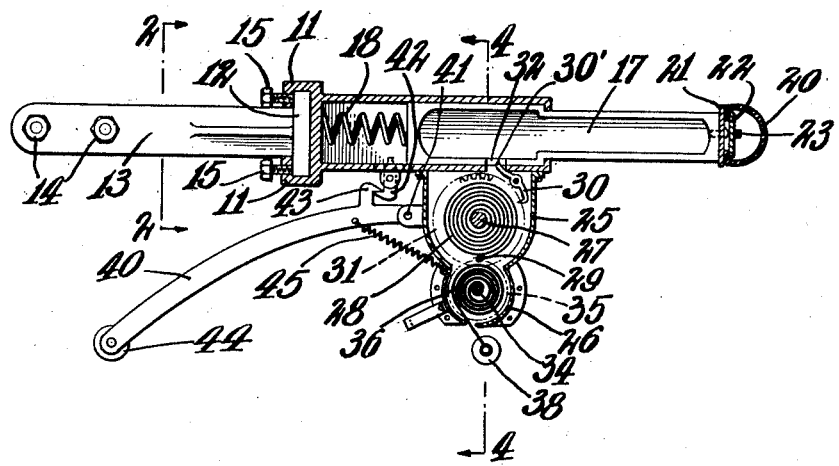
Fig. 5 is a transverse section on the line 5—5 of Fig. 4.

In the use of the device, which is secured to an automobile, partially indicated at 45 as in Fig. 1, the parts normally occupy the position shown in Fig. 5 with the arms 40 raised and the apron 36 coiled in the casing 26.

When the bumper bar 20 strikes anyone in front of the automobile the slide-bars 17 are moved backward in the frames 10, moving pawls 30 and 42 to inoperative position, the springs 28 causing the shaft 35 to be rotated through gears 31 and 35, and the apron to be projected from the casing 26, while the arms 40 are swung forward to support the apron.

Having thus described my invention what I claim as new and desire to protect by Letters Patent of the United States is as follows:

1. A vehicle fender comprising a bumper, a pair of slide-bars on which said bumper is fixed, a shaft, an apron normally wound on said shaft, power means for rotating said shaft to unwind said apron, a part holding said power means against operation, said part being released from its holding position by a sliding movement of the said bars, and a pair of arms normally held in inoperative position and adapted to be released to support said apron when said bars are so moved.

2. A vehicle fender comprising a bumper, a pair of slide-bars on which said bumper is fixed, a shaft, an apron normally wound on said shaft, power means for rotating said shaft to unwind said apron, a part holding said power means against operation, said part being released from its holding position by a sliding movement of the said bars, and a pair of arms normally held in inoperative position and adapted to be released to support said apron when said bars are so moved, a pawl engaging each arm to support it in inoperative position, said pawl having a tail projecting into the path of the said slide-bar.

3. A vehicle fender comprising a bumper, a pair of slide-bars on which said bumper is fixed, a shaft, an apron normally wound on said shaft, power means for rotating said shaft to unwind said apron, a part holding said power means against operation, said part being released from its holding position by a sliding movement of the said bars, and a pair of arms normally held in inoperative position and adapted to be released to support said apron when said bars are so moved, a pawl engaging each arm to support it in inoperative position, said pawl having a tail projecting into the path of the said slide-bar, a spring for moving said arms to supporting position, and a catch for holding said arms in supporting position.

4. A vehicle fender comprising a bumper, a pair of slide-bars on which said bumper is fixed, guide-frames for said slide-bars, a pair of boxes depending from said guide-frames, a shaft journaled in said boxes, a clock spring in each box adapted to rotate said shaft, a transverse casing depending from the said boxes, a shaft in said casing, an apron wound on said shaft and adapted to project from the said casing, a pair of meshing gears on the said shafts, and a device lying in the path of movement of one of said slide-bars and holding the first shaft against rotation.

5. A vehicle fender comprising a bumper, a pair of slide-bars on which said bumper is fixed, guide-frames for said slide-bars, a pair of boxes depending from said guide-frames, a shaft journaled in said boxes, a clock spring in each box adapted to rotate said shaft, transverse casing depending from the said boxes, a shaft in said casing, an apron wound on said shaft and adapted to project from the said casing, a pair of meshing gears on the said shafts, and a device lying in the path of movement of one of said slide-bars and holding the first shaft against rotation, said device comprising a pawl engaging one of the said gears and having a tail adapted to be engaged by the said slide-bar.

In testimony whereof I have affixed my signature.

SIMON ROTHAUSKI.